(12) United States Patent
Thorne

(10) Patent No.: US 6,198,066 B1
(45) Date of Patent: Mar. 6, 2001

(54) METHOD AND APPARATUS FOR RADIATED BEAM MARKING OF A GOLF CLUB PART AND SUCH PART

(75) Inventor: John K. Thorne, Prescott, AZ (US)

(73) Assignee: Sturm, Ruger & Company, Inc., Southport, CT (US)

( * ) Notice: Subject to any disclaimer, the term of this patent is extended or adjusted under 35 U.S.C. 154(b) by 0 days.

(21) Appl. No.: 09/257,367

(22) Filed: Feb. 24, 1999

(51) Int. Cl.$^7$ .......................... B23K 15/00; A63B 53/04
(52) U.S. Cl. .......................... 219/121.17; 219/121.35; 473/324
(58) Field of Search .................. 219/121, 17, 121.35, 219/121.66, 121.85; 473/324, 409

(56) References Cited

U.S. PATENT DOCUMENTS

| | | |
|---|---|---|
| 3,701,880 | 10/1972 | Rively et al. . |
| 4,335,295 | 6/1982 | Fowler . |
| 4,547,649 | 10/1985 | Butt et al. . |
| 4,727,235 | 2/1988 | Stamer et al. . |
| 4,843,207 | 6/1989 | Urbanek et al. . |
| 4,922,077 | 5/1990 | Gordon et al. . |
| 4,972,061 | 11/1990 | Duley et al. . |
| 4,974,736 | 12/1990 | Okunuki et al. . |
| 5,264,310 * | 11/1993 | Kawai ............................ 430/5 |
| 5,378,512 | 1/1995 | Van Wyk . |
| 5,420,575 | 5/1995 | Cheraso et al. . |
| 5,632,916 | 5/1997 | Lappalainen et al. . |
| 5,755,626 | 5/1998 | Shira . |
| 5,800,285 | 9/1998 | Thorne et al. . |

FOREIGN PATENT DOCUMENTS

| | | |
|---|---|---|
| 0773505 * | 5/1997 | (EP) . |
| 6-305241 * | 11/1994 | (JP) . |

OTHER PUBLICATIONS

Electron Beam Welding, p. 545, No Date Available.

* cited by examiner

Primary Examiner—Samuel M. Heinrich
(74) Attorney, Agent, or Firm—Pennie & Edmonds LLP

(57) ABSTRACT

A method for treating the surface of a golf club part having a non-smooth surface such as a part which has been cast. Preferably, in those instances where the part is cast, the part is abraded for example by tumbling or by directing a light sandblast against the part to create a low reflectivity surface. Such abrading roughens the golf club part so that greater contrast can be obtained using radiated beam treatment. Surface roughening can also be created by acid etch or other suitable method. The club part is mounted in a beam treatment station to permit projecting a radiated beam on selected areas of the part's surface resulting in the momentary and superficial melting or fusing of the surface which makes such areas less rough and more light reflective than adjacent surface areas. Patterns are formed by causing relative movement between the part and a high energy heat source such as a radiated beam. Preferably the heat source or beam is held fixed and the part mounted on a movable table. Table movement may be controlled by a programmable computer, or other suitable arrangement.

5 Claims, 2 Drawing Sheets

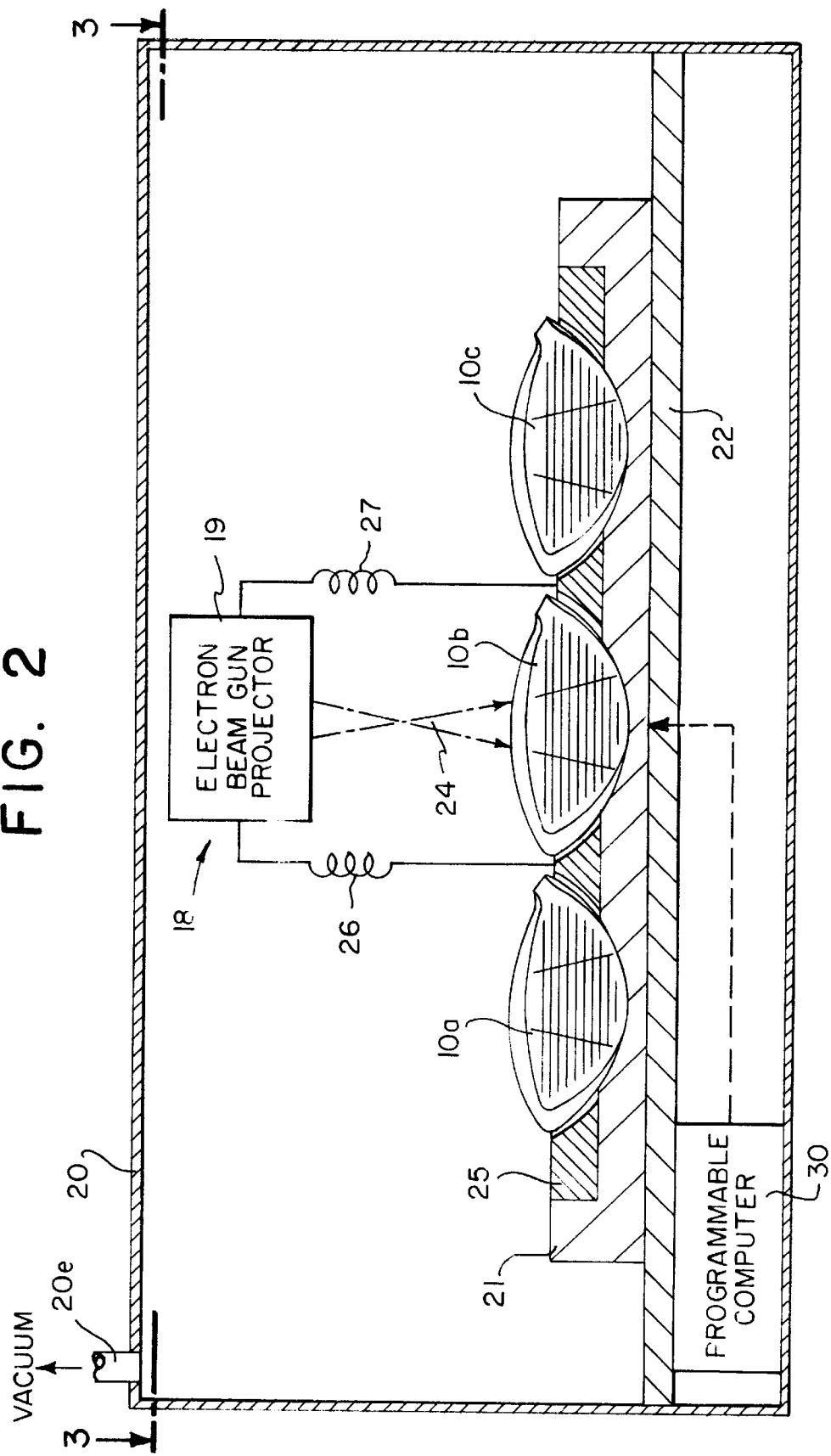

METHOD AND APPARATUS FOR RADIATED BEAM MARKING OF A GOLF CLUB PART AND SUCH PART

BACKGROUND OF THE INVENTION

Radiated beams such as electron or laser beams have been used to mark and decorate metal objects (U.S. Pat. No. 4,335,295). Beam energy and the heat generated alters the micro structure and light reflectance of the surface and causes contrasts in the appearance of the metal surfaces.

Golf club heads fabricated by casting have had graphic designs created dulling the casting process or thereafter by etching the club head surface (U.S. Pat. No. 5,800,285).

SUMMARY OF THE INVENTION

Broadly, the invention comprises a method and apparatus for treating the surface of a golf club part having a non-smooth surface such as a part which has been cast. Preferably, in those instances where the part is cast, the part is abraded for example by tumbling or by directing a light sandblast against the part to create a low reflectivity surface. Such abrading roughens the golf club part so that greater contrast can be obtained using radiated beam treatment. Surface roughening can also be created by acid etch or other suitable method.

The club part is mounted in a beam treatment station to permit projecting a radiated beam on selected areas of the part's surface resulting in the momentary and superficial melting or fusing of the surface which makes such areas less rough and more light reflective than adjacent surface areas. Patterns are formed by causing relative movement between the part and a high energy heat source such as a radiated beam. Preferably the heat source or beam is held fixed and the part mounted on a movable table. Table movement may be controlled by a programmable computer, or other suitable arrangement.

BRIEF DESCRIPTION OF THE DRAWINGS

FIG. 2 is an elevational view of a radiated beam treatment station; and

DESCRIPTION OF THE PREFERRED EMBODIMENT

Figure 1:
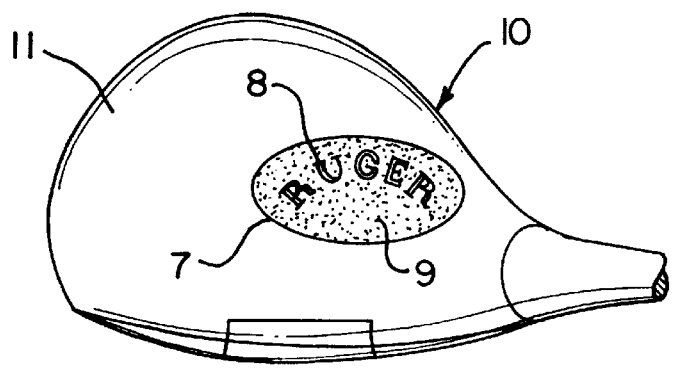
FIG. 1 is a plan view of a metal golf club head including a partial hosel marked in accordance with the present invention.

In FIG. 1, a metal cast golf club head part 10 is fabricated by casting, forging or other method. Part 10, particularly when cast, has a top surface 11 which has sufficient irregularities that radiated beam treatment produces markedly contrasting surface areas 8 and 9 in surface 11. Surface area 8 is the word "RUGER" in stylized letters and background surface area 9 is the surrounding part surface within oval 7. Such contrasting surface areas 8 and 9 are after treatment relatively rough and relatively smooth with differing light reflection characteristics.

Figure 3:
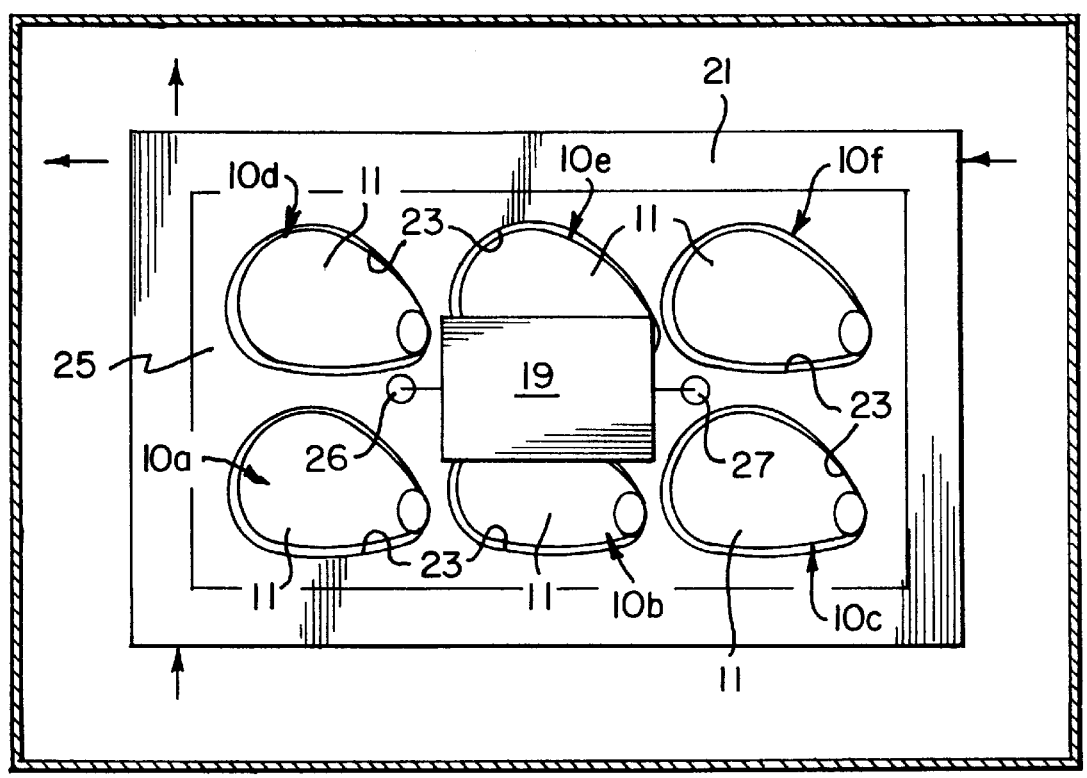
FIG. 3 is a sectional view along line 3—3 of FIG. 2.

Turning to FIGS. 2 and 3, beam 24 creates graphic designs in surface 11 such as surface area 8 including the word "RUGER". Prior to such radiated treatment, part 10 if its surface is not sufficiently rough after fabrication, may be roughened or abraded to increase surface irregularities in surface 11 by sandblasting, tumbling or other roughening treatment using an abrasive material or acid.

The apparatus for treating the club parts, whether further roughened or not, is a charged particle beam such as an electron beam station 18 including electron beam gun projector 19 mounted above computer numerical control table 21 which in turn is mounted on station base 22 positioned within enclosure 20. Enclosure 20 is evacuated by drawing a vacuum at outlet 20e. Electron beam treatment must be carried out in a vacuum to avoid oxidation of the anode (not shown) of gun projector 19. Preferably beam projector 19 is stationary and X-Y control table 21, with parts 10 mounted in pallet 25 having part receiving recesses 23, moves to create the desired graphic pattern in surface 11 of parts 10. Pallet 25 holds six (6) parts 10a–f.

Alternatively, table 21 and part 10 mounted therein is held in a stationary position and projector 19 moves to project beam 24 against selected areas of the surfaces of parts 10. In either arrangement the relative movement between beam 24 and parts 10 creates marks, numbers, patterns, designs, signatures or other graphics on the part surfaces. The focus and width of beam 24 is controlled by varying the distance of beam station 18 from parts 10 and varying the energy in magnetic focusing coil 26. Beam 24 may be focused from a pinpoint to a relatively wide beam of 1/16 of an inch or under. Beam 24 may be energized intermittently depending on the graphics desired.

Electron beam station 18 preferably includes an electron beam welding unit manufactured by Cambridge Vacuum Engineering Ltd. distributed by Wentgate Dynaweld Inc. More particularly, the welding unit is Model No. CW604 Serial No. M/C547. It operates between 5–60 kilovolts with a beam intensity of 0.5–40 milliamps. and a beam focus current of 275–550 milliamps. The vacuum pulled in enclosure 20 is about 10 to minus 4 millibars. Table 21 is preferably an Allen Bradley Controller.

A programmable computer 30 positioned exterior to vacuum chamber 20 controls the movements of table 21. The computer also controls characteristics of the projected beam 24 including its direction, width and intensity.

The beam treatment of each surface area of each part 10 is controlled such that selected surface areas melt momentarily and fuse to a degree that the treated surface areas reflect more light than the adjacent untreated areas thus highlighting the treated areas. Any beam including a laser beam may be used provided the beam creates sufficient heat on surface 11 of part 10 to melt or fuse the treated area of surface 11 sufficiently so that when the melted or fused area solidifies it reflects more light than an adjacent untreated area. When a laser beam heat source is used, evacuation is not required.

I claim:

1. A method of treating a golf club part comprising
   1) fabricating a golf club part of metal material in such a way that a surface area lacks smoothness;
   2) providing a radiated charged particle beam transmitter;
   3) positioning the club part in an evacuated enclosure a selected distance from the transmitter; and
   4) transmitting a radiated beam charged particle against the part surface area with selected intensity for a selected period of time to cause the area to be more light reflective than such area is prior to beam transmission.

2. The method of claim 1 in which the club part is fabricated by casting.

3. The method of claim 1 providing in addition positioning apparatus for controlling the relative position between the beam and club part so that selected areas of the part are made more light reflective than adjacent areas.

4. The method of claim 3 in which the positioning apparatus includes a programmable computer to control the positioning apparatus.

5. A method of treating a golf club part comprising:
1) fabricating a golf club part of metal material in such a way that a surface area lacks smoothness;
2) abrading the fabricated golf club part;
3) providing a radiated beam transmitter;
4) positioning the club part selected distances from the transmitter; and
5) transmitting a radiated beam against the part surface area with selected intensity for a selected period of time to cause the area to be more light reflective than such area is prior to beam transmission.

* * * * *